US012454075B2

(12) United States Patent
Findley (10) Patent No.: US 12,454,075 B2
(45) Date of Patent: Oct. 28, 2025

(54) ADDITIVE MANUFACTURE OF COMPLEX INTERMETALLIC AND CERAMIC STRUCTURES

(71) Applicant: Lockheed Martin Corporation, Bethesda, MD (US)

(72) Inventor: David Glen Findley, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/545,453

(22) Filed: Dec. 19, 2023

(65) Prior Publication Data
US 2024/0149492 A1    May 9, 2024

Related U.S. Application Data

(62) Division of application No. 16/003,931, filed on Jun. 8, 2018, now Pat. No. 11,878,442.

(51) Int. Cl.
*B33Y 10/00* (2015.01)
*B22F 10/10* (2021.01)
(Continued)

(52) U.S. Cl.
CPC ............ *B28B 11/243* (2013.01); *B22F 10/10* (2021.01); *B22F 12/55* (2021.01); *B28B 1/001* (2013.01);
(Continued)

(58) Field of Classification Search
CPC ....... B28B 11/243; B28B 1/001; B22F 10/10; B22F 12/55; B22F 10/62; B22F 10/66;
(Continued)

(56) References Cited

U.S. PATENT DOCUMENTS 2,775,024 A    12/1956  Seal
2,940,163 A     6/1960  Davies
(Continued)

FOREIGN PATENT DOCUMENTS

JP       2-228403 A     9/1990
JP     2015-24651 A     2/2015
(Continued)

OTHER PUBLICATIONS

U.S. Appl. No. 16/003,931 (US 2019/0375007), filed Jun. 8, 2018 (Dec. 12, 2019).
(Continued)

*Primary Examiner* — Rebecca Janssen
(74) *Attorney, Agent, or Firm* — Baker Botts L.L.P.

(57) ABSTRACT

According to some embodiments, a system includes a three-dimensional (3D) printer, a hydraulic press, and a kiln. The three-dimensional printer includes a print bed, a first printhead, and a second printhead. The first printhead is configured to deposit a layer of a first powder on the print bed. The second printhead is configured to deposit a layer of a second powder on the print bed. The hydraulic press is configured to compress a greenware to form a compressed greenware. The kiln is configured to heat the compressed greenware to a reaction temperature to form an object. The object is surrounded by an excess of the first powder. The kiln is also configured to heat the object surrounded by the excess of the first powder to a melting temperature. The melting temperature is at least the melting point of the first powder and less than the melting point of the object.

7 Claims, 6 Drawing Sheets

(51) Int. Cl.
  *B22F 10/62*   (2021.01)
  *B22F 10/66*   (2021.01)
  *B22F 12/55*   (2021.01)
  *B28B 1/00*    (2006.01)
  *B28B 11/24*   (2006.01)
  *B33Y 30/00*   (2015.01)
  *B33Y 70/00*   (2020.01)
  *B33Y 70/10*   (2020.01)
  *B33Y 50/02*   (2015.01)

(52) U.S. Cl.
  CPC .............. *B33Y 10/00* (2014.12); *B33Y 30/00* (2014.12); *B33Y 70/00* (2014.12); *B33Y 70/10* (2020.01); *B22F 10/62* (2021.01); *B22F 10/66* (2021.01); *B33Y 50/02* (2014.12)

(58) Field of Classification Search
  CPC ...... B22F 2999/00; B22F 3/003; B33Y 10/00; B33Y 30/00; B33Y 70/00; B33Y 70/10; B33Y 50/02; C22C 1/047; Y02P 10/25; C04B 35/5611; C04B 35/5622; C04B 35/5626; C04B 35/573; C04B 2235/6026
  See application file for complete search history.

(56) References Cited

U.S. PATENT DOCUMENTS

| | | | |
|---|---|---|---|
| 4,731,115 | A | 3/1988 | Abkowitz et al. |
| 4,906,430 | A | 3/1990 | Abkowitz et al. |
| 5,318,468 | A | 6/1994 | Lotthammer et al. |
| 5,555,481 | A | 9/1996 | Rock et al. |
| 5,799,238 | A | 8/1998 | Fisher, II et al. |
| 6,696,168 | B2 | 2/2004 | Hasegawa et al. |
| 7,241,415 | B2 | 7/2007 | Khoshnevis |
| 7,992,763 | B2 | 8/2011 | Vecchio et al. |
| 8,727,672 | B2 | 5/2014 | Ederer et al. |
| 8,993,095 | B2 | 3/2015 | Ishida et al. |
| 9,469,074 | B2 | 10/2016 | Ederer et al. |
| 9,550,207 | B2 | 1/2017 | Ackelid |
| 9,713,844 | B2 | 7/2017 | Ackelid |
| 9,873,180 | B2 | 1/2018 | Bajaj et al. |
| 2004/0018107 | A1 | 1/2004 | Khoshnevis |
| 2013/0130050 | A1 | 5/2013 | Park et al. |
| 2014/0374958 | A1 | 12/2014 | Taniuchi et al. |
| 2017/0014950 | A1* | 1/2017 | Okada .................... B22F 10/47 |
| 2017/0028630 | A1 | 2/2017 | Ederer et al. |
| 2017/0173696 | A1 | 6/2017 | Sheinman |
| 2018/0311728 | A1* | 11/2018 | Kottilingam ............ B22F 10/14 |
| 2019/0134705 | A1* | 5/2019 | Sheinman ............... B22F 12/53 |

FOREIGN PATENT DOCUMENTS

| | | |
|---|---|---|
| WO | WO 2015/141032 | 9/2015 |
| WO | WO 2017/179052 | 10/2017 |

OTHER PUBLICATIONS

U.S. Appl. No. 16/003,931, Dec. 12, 2023 Issue Fee Payment.
U.S. Appl. No. 16/003,931, Sep. 20, 2023 Notice of Allowance.
U.S. Appl. No. 16/003,931, Jun. 7, 2023 Amendment and Request for Continued Examination (RCE).
U.S. Appl. No. 16/003,931, Mar. 7, 2023 Final Office Action.
U.S. Appl. No. 16/003,931, Dec. 26, 2022 Response to Non-Final Office Action.
U.S. Appl. No. 16/003,931, Aug. 25, 2022 Non-Final Office Action.
U.S. Appl. No. 16/003,931, Jun. 2, 2022 Amendment and Request for Continued Examination (RCE).
U.S. Appl. No. 16/003,931, Mar. 2, 2022 Final Office Action.
U.S. Appl. No. 16/003,931, Dec. 6, 2021 Response to Non-Final Office Action.
U.S. Appl. No. 16/003,931, Aug. 6, 2021 Non-Final Office Action.
U.S. Appl. No. 16/003,931, Jul. 26, 2021 Amendment and Request for Continued Examination (RCE).
U.S. Appl. No. 16/003,931, Apr. 26, 2021 Final Office Action.
U.S. Appl. No. 16/003,931, Mar. 30, 2021 Response to Non-Final Office Action.
U.S. Appl. No. 16/003,931, Dec. 30, 2020 Non-Final Office Action.
U.S. Appl. No. 16/003,931, Nov. 23, 2020 Amendment and Request for Continued Examination (RCE).
U.S. Appl. No. 16/003,931, Jun. 23, 2020 Final Office Action.
U.S. Appl. No. 16/003,931, May 20, 2020 Response to Non-Final Office Action.
U.S. Appl. No. 16/003,931, Feb. 20, 2020 Non-Final Office Action.
Badiru et al., Additive Manufacturing Handbook, CRC Press, pp. 132 & 255-56, May 2017 (2017).
Chemicool Chemistry Dictionary, Definition of Inert (2021).
EP Communication pursuant to Article 94(3) EPC, regarding Application No. 19 178 690.4-1103 (EP 123804-JH). (Jan. 26, 2022).
EPO search report communication regarding Application No. 19178690.4-1103, Oct. 22, 2019.
J.J.S. Dilip et al., "A novel method to fabricate TiAl intermetallic alloy 3D parts using additive manufacturing," Defence Technology 13:72-76, journal homepage: www.elsevier.com/locate/dt (2017).
Japanese Official Action with English translation corresponding to Japanese Patent Application No. 2019-106756, dated May 25, 2023, 6 pages.
K.S. Vecchio, "Synthetic Multifunctional Metallic-Intermetallic Laminate Composites," JOM, 57(3), eScholarship, Univ. of CA. (Jan. 3, 2005).
Letter from Agent for Office Action corresponding to Japanese Patent Application No. 2019-106756, dated Jun. 30, 2023, 3 pages.

* cited by examiner

ADDITIVE MANUFACTURE OF COMPLEX INTERMETALLIC AND CERAMIC STRUCTURES

CROSS-REFERENCE TO RELATED APPLICATIONS

This application is a divisional of U.S. patent application Ser. No. 16/003,931, filed Jun. 8, 2018, the contents of which are hereby incorporated by reference in its entirety.

TECHNICAL FIELD

The present disclosure relates generally to three-dimensional (3D) printing and in particular to 3D printing complex intermetallic and ceramic structures intrinsically supported by an excess of a material in situ.

BACKGROUND

Three-dimensional (3D) printing is an additive manufacturing process that allows for the manufacture of objects by "building up" an object. In contrast to subtractive techniques, such as machining, in which material is removed from a bulk material in order to form the shape of an object, 3D printing lays down successive layers of material to form the shape of an object. Typical materials used for 3D printing may include plastics, ceramics, and metals.

SUMMARY

According to some embodiments, a system includes a three-dimensional (3D) printer, a hydraulic press, and a kiln. The three-dimensional printer includes a print bed, a first printhead, and a second printhead. The print bed includes an inert material. The first printhead is configured to deposit a layer of a first powder on the print bed. The second printhead is configured to deposit a layer of a second powder on the print bed. The layers of the first powder and the second powder form a greenware. The hydraulic press is configured to compress the greenware to form a compressed greenware. The kiln is configured to heat the compressed greenware to a reaction temperature to form an object. The object is surrounded by an excess of the first powder. The kiln is also configured to heat the object surrounded by the excess of the first powder to a melting temperature. The melting temperature is at least the melting point of the first powder and less than the melting point of the object.

In other embodiments, a method for additive manufacture includes forming a greenware by depositing a first layer of a first powder on a print bed using a first printhead, and depositing a second layer of a second powder on a print bed using a second printhead. The method also includes compressing the greenware using a hydraulic press to form a compressed greenware. The method further includes heating the compressed greenware to a reaction temperature using a kiln to form an object, where the object is surrounded by an excess of the first powder. The method also includes heating the object surrounded by the excess of the first powder to a melting temperature using the kiln, where the melting temperature is at least the melting point of the first powder and less than the melting point of the object. Heating to the melting temperature melts the excess of the first powder from around the object.

In yet other embodiments, a three-dimensional (3D) printer includes a print bed, a first printhead, a second printhead, and a control unit. The control unit is configured to deposit a first layer of a first powder on the print bed using the first printhead. The control unit is also configured to deposit a second layer of a second powder on the print bed using the second printhead. The layers of the first powder and the second powder form a greenware. The greenware is configured to be compressed in a hydraulic press to form a compressed greenware. The compressed greenware is configured to be heated in a kiln to a reaction temperature to form an object, surrounded by an excess of the first powder. The object surrounded by an excess of the first powder is configured to be heated in the kiln to a melting temperature. The melting temperature is at least the melting point of the first powder and less than the melting point of the object.

Technical advantages of certain embodiments may include, after 3D printing a greenware from a first powder and a second powder, using a hydraulic press to compress the greenware, and heating the compressed greenware to a reaction temperature to form an object surrounded by an excess of the first powder. The excess of the first powder may structurally support the object as it is formed at the reaction temperature in the kiln. This structural support may allow for the formation of more complex objects, without the limitation of forming objects with only self-supporting structures, such as a cube or a cup. This structural support may also allow for the formation of more complex objects without the need for customized structural supports for the greenware during heating in the kiln. This structural support may also allow for the formation of more complex objects without use of a binder, which may be a contaminant source for the formation of the object. The excess of the first powder may also protect the formation of the object from contamination by an atmosphere in the kiln. With the excess of the first powder surrounding the reaction that forms the object in the kiln, the reaction is protected from oxygen in the atmosphere, reducing the risk of oxidation. The greenware may therefore be fired in atmosphere in a kiln, without the need for an inert atmosphere. Other technical advantages will be readily apparent to one skilled in the art from the following figures, descriptions, and claims. Moreover, while specific advantages may have been enumerated above, various embodiments may include all, some, or none of the enumerated advantages.

BRIEF DESCRIPTION OF THE DRAWINGS

For a more complete understanding of the disclosed embodiments and their features and advantages, reference is now made to the following description taken in conjunction with the accompanying drawings, in which.

DETAILED DESCRIPTION

Embodiments of the present disclosure and its advantages are best understood by referring to FIGS. 1 through 4, like numerals being used for like and corresponding parts of the various drawings.

Current techniques of powder-based 3D printing intermetallic structures often use pre-mixed metallic powders and a binder to produce a greenware made of powder and held together by binder. That greenware is then heated in a kiln or furnace to vaporize the binder and leave an intermetallic object. Removing the binder from the greenware through heating causes the greenware to be porous, which limits the range of densities available in the final intermetallic object. It also results in some residual binder contaminant if not all of the binder can be completely removed. Heating in a kiln must also typically be done in an inert atmosphere to protect the reaction that forms the intermetallic from oxidation by oxygen in the atmosphere. Maintaining an inert atmosphere in the kiln adds to equipment and maintenance costs. Finally, because the binder will no longer hold the intermetallic object together when it is removed by heating, the intermetallic must have a self-supporting structure, such as a cube or a cylinder, which limits the variety of structures that may be created using current techniques. If the structure is not self-supporting, customized supports must be created to support the structure of the greenware during heating. The need for these customized supports also increases the time, cost, and effort of creating intermetallic structures using current powder-based 3D printing techniques.

In order to eliminate these and other problems, embodiments of the present disclosure 3D print a greenware surrounded by an excess of a first powder, and compress that greenware and excess of first powder into a compressed greenware surrounded by an excess of compressed first powder before heating. The compressed greenware surrounded by an excess of compressed first powder is heated to a reaction temperature to form an intermetallic or ceramic object surrounded by an excess of compressed first powder. The excess of compressed first powder supports the formation of the intermetallic or ceramic object during the reaction, eliminating the need for a binder or customized supports, and allowing for a variety of complex structures to be formed. Eliminating the need for a binder also allows for a variety of densities of structures to be formed, including fully-dense, non-porous structures. Additionally, eliminating the need for a binder reduces a source of potential contamination. The excess of compressed first powder also protects the reaction forming the intermetallic or ceramic from oxidation, allowing the heating of the greenware to occur in atmosphere. Once the intermetallic or ceramic object is formed, the kiln is then heated to the melting point of the first powder, melting away the first powder from around the intermetallic or ceramic object.

The teachings of this disclosure recognize that using 3D printing techniques with a hydraulic press to form a compressed greenware surrounded by an excess of compressed first powder may allow for the creation of objects made of a variety of intermetallic and ceramics in a variety of useful shapes. For example, using 3D printing techniques with a hydraulic press to form a compressed greenware surrounded by an excess of compressed first powder, a turbine fan having almost any geometry or density could be printed. As another example, using 3D printing techniques with a hydraulic press to form a compressed greenware with an excess of compressed first powder, a shuttle-cock could be printed. Furthermore, by using different metallic or pre-ceramic powders separately or in combination, the properties of the printed object, including density, could be varied to meet various design objectives.

Figure 1A:
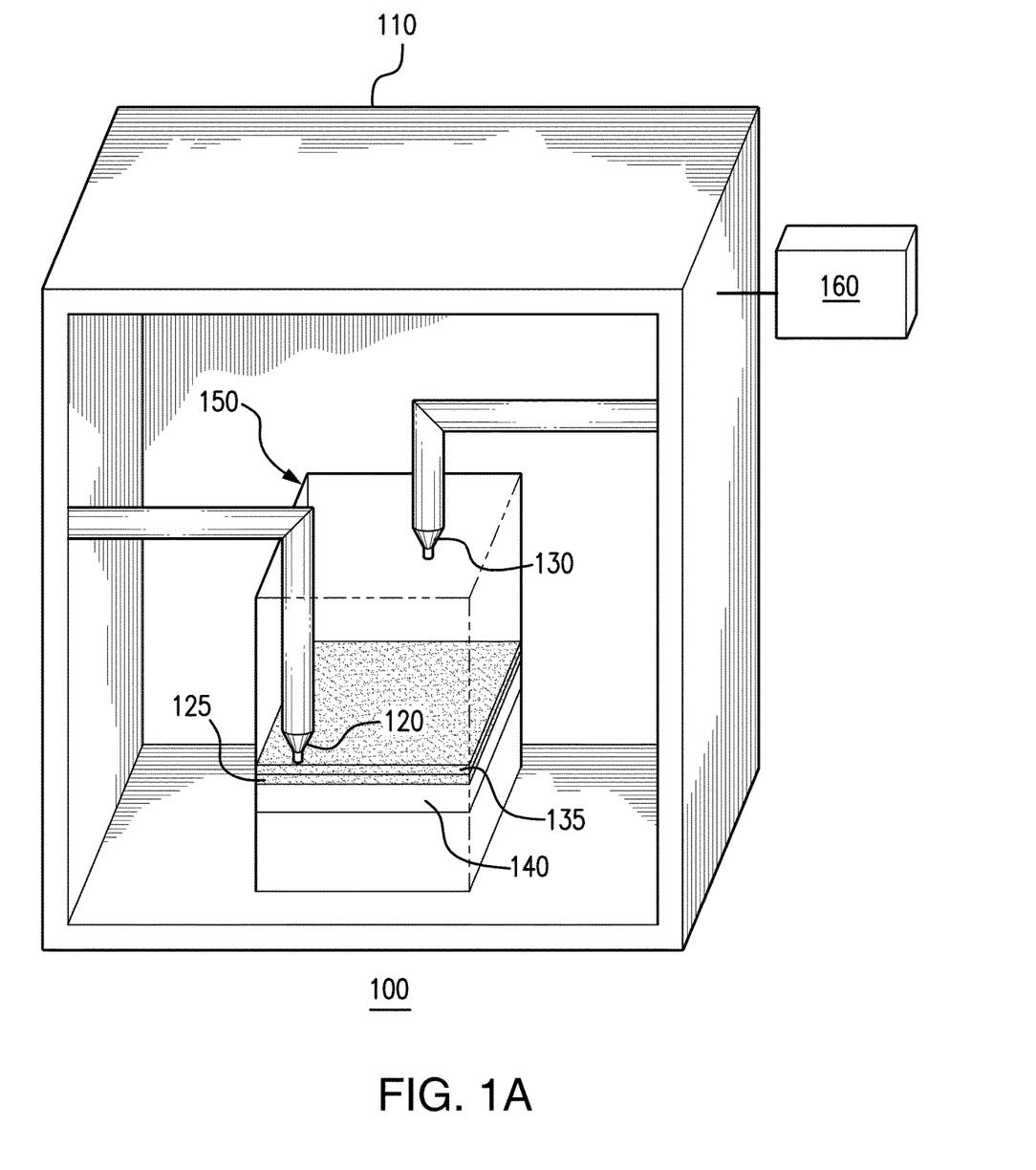
FIG. 1A illustrates an example of a 3D printer system, according to certain embodiments.
Figure 1B:
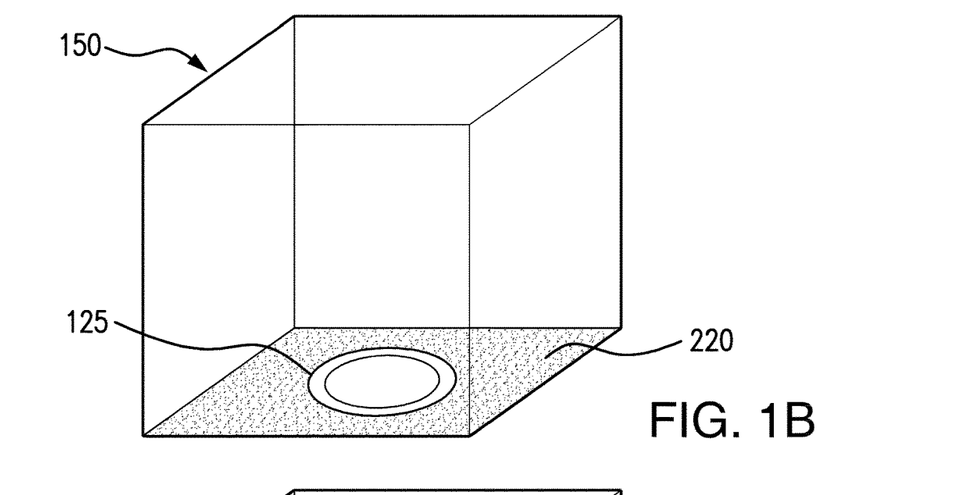
FIG. 1B illustrates an example view of a workbox with a first layer deposited, according to certain embodiments.
Figure 1C:
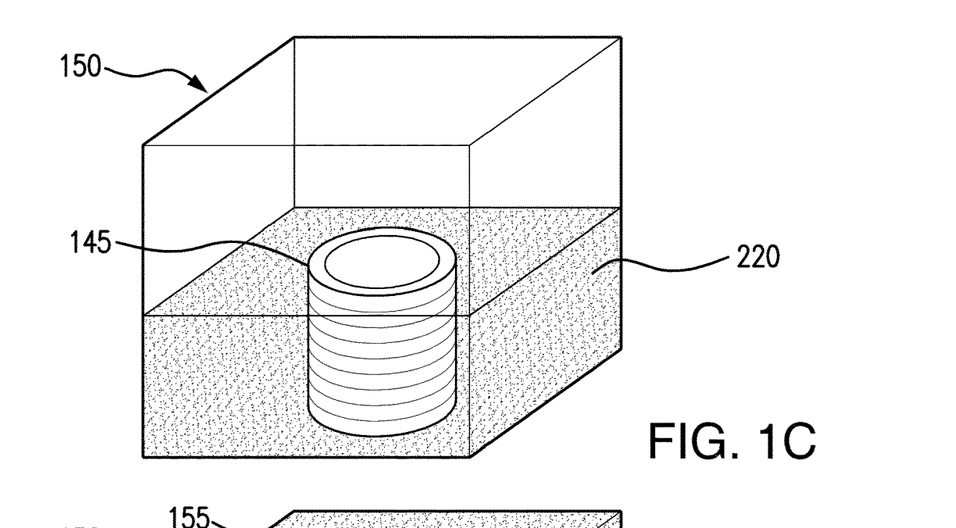
FIG. 1C illustrates an example view of a workbox during 3D printing when additional layers have been deposited, but before the last layer has been deposited, according to certain embodiments.
Figure 1D:
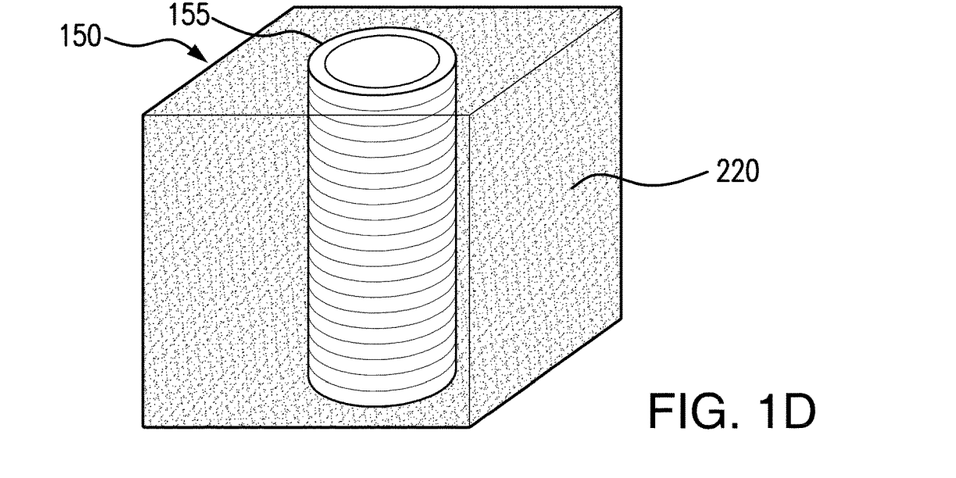
FIG. 1D illustrates an example view of a workbox when a final layer has been deposited, according to certain embodiments.
Figure 2A:
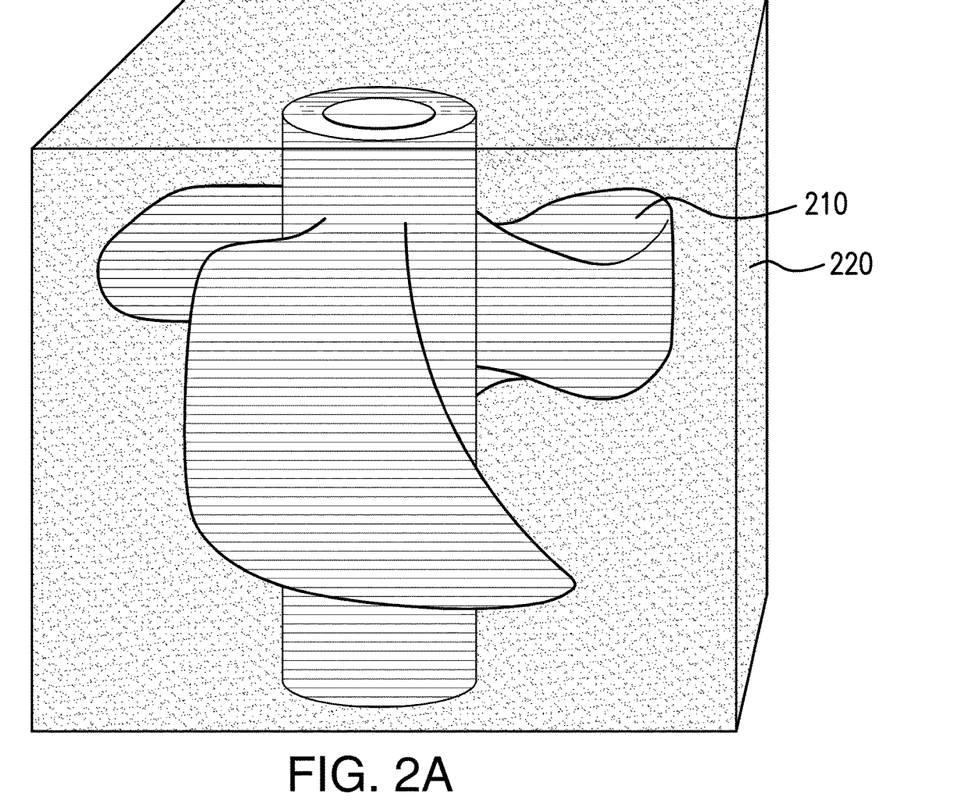
FIG. 2A illustrates an example object surrounded by an excess of a first powder, according to certain embodiments.
Figure 2B:
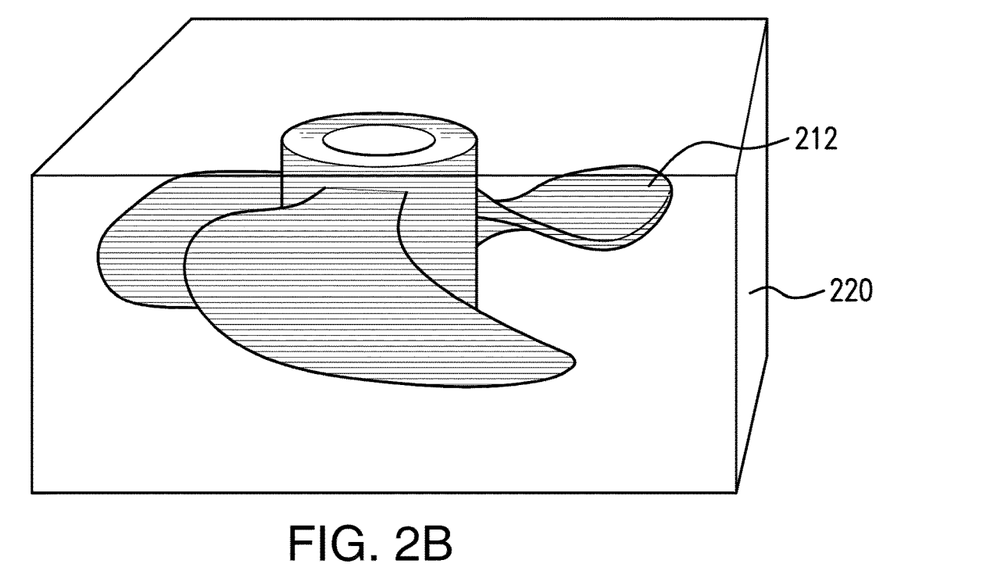
FIG. 2B illustrates an example of a compressed greenware surrounded by an excess of first powder, according to certain embodiments.
Figure 2C:
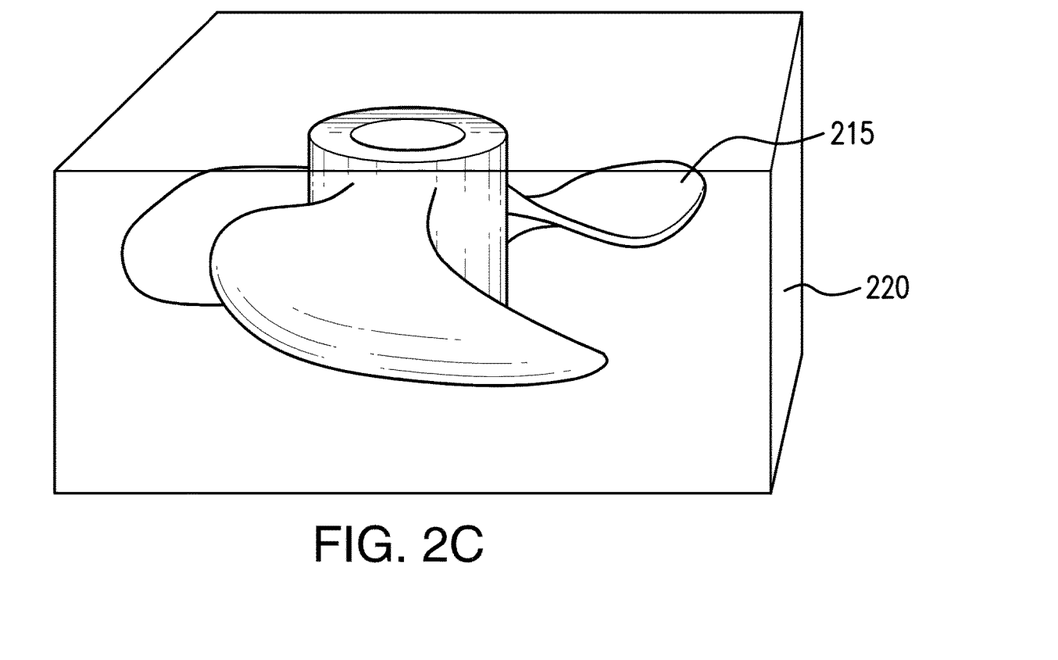
FIG. 2C illustrates an example object surrounded by an excess of a first powder, according to certain embodiments.
Figure 2D:
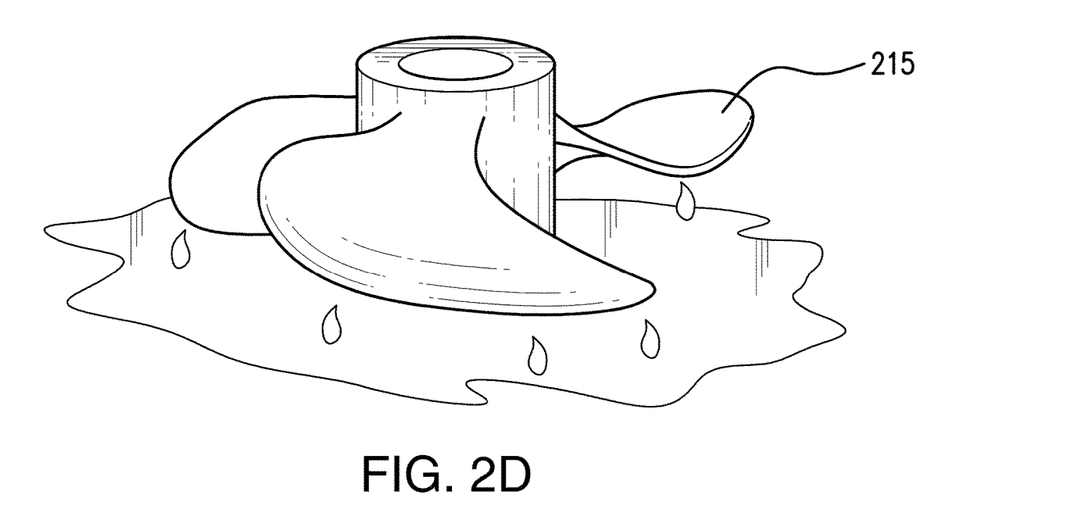
FIG. 2D illustrates an example object during removal of the excess of first powder, according to certain embodiments.
Figure 3:
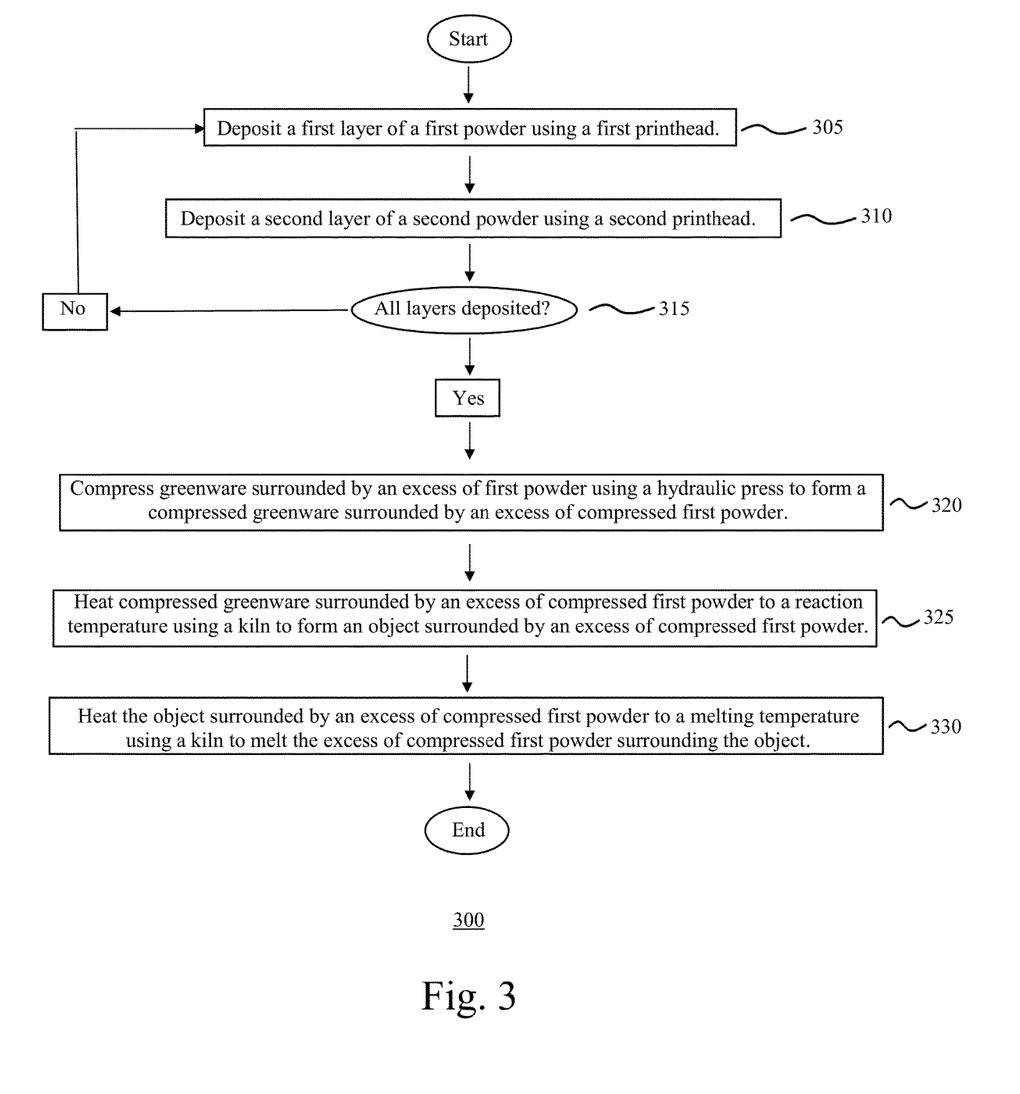
FIG. 3 illustrates a method of additive manufacture, according to certain embodiments.
Figure 4:
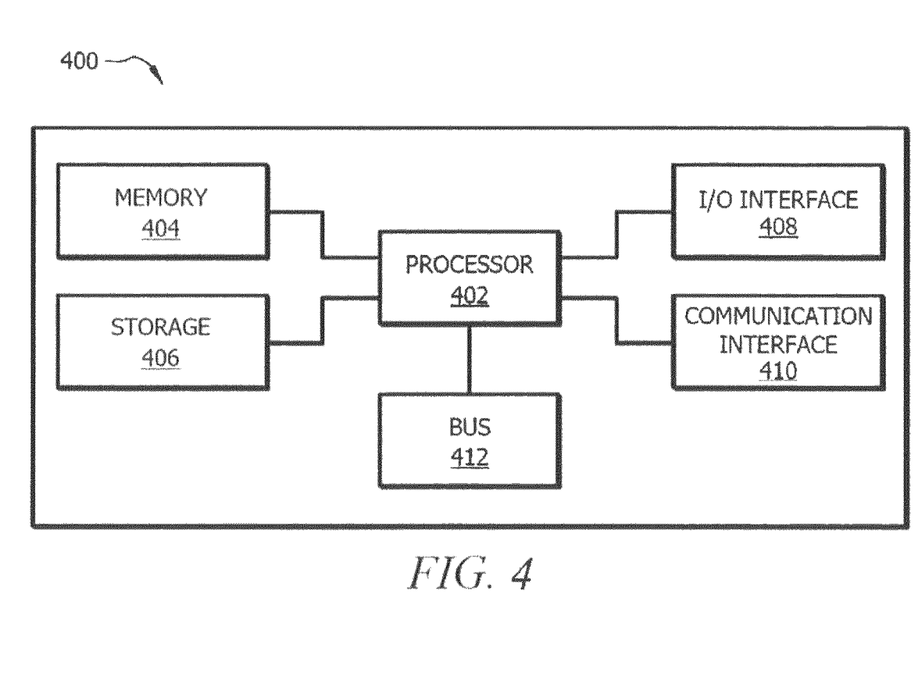
FIG. 4 illustrates an example computer system that may be used to control the 3D printer of FIG. 1, according to certain embodiments.

The system will be described in more detail using FIGS. 1 through 4. FIG. 1A illustrates an example of a 3D printer system, according to certain embodiments. FIGS. 1B, 1C, and 1D illustrate example successive views of workbox 150 in 3D printer system 100 as it is progressively filled with layers of powder during 3D printing, according to certain embodiments. FIG. 2A illustrates an example greenware surrounded by an excess of a first powder, according to certain embodiments. FIG. 2B illustrates an example compressed greenware surrounded by an excess of compressed first powder, according to certain embodiments. FIG. 2C illustrates an example object surrounded by an excess of compressed first powder, according to certain embodiments. FIG. 2D illustrates an example object during removal of the excess of compressed first powder, according to certain embodiments. FIG. 3 illustrates a method of additive manufacture, according to certain embodiments. FIG. 4 illustrates an example computer system that may be used to control the 3D printer of FIG. 1, according to certain embodiments.

FIG. 1A illustrates an example 3D printer system 100, according to certain embodiments. 3D printer system 100 includes 3D printer 110, first printhead 120, second printhead 130, print bed 140, and workbox 150. In general, certain embodiments of 3D printer system 100 use printheads 120 and 130 to deposit layers of powder, such as layers 125 and 135, onto print bed 140 in workbox 150 to form a greenware surrounded by an excess of a first powder. An example greenware surrounded by an excess of a first powder is illustrated in FIG. 2A. The greenware and excess of first powder may be compressed by a hydraulic press to form a consolidated, compressed greenware surrounded by an excess of compressed first powder. An example compressed greenware surrounded by an excess of compressed first powder is illustrated in FIG. 2B. The hydraulic press may compress the greenware and excess of first powder in workbox 150. The excess of compressed first powder surrounding the compressed greenware may include a solid metal obtained from the first powder, enclosing the compressed greenware.

The compressed greenware surrounded by an excess of compressed first powder (or enclosed by a solid metal obtained from the first powder) may be heated in a kiln at a reaction temperature to form an intermetallic or ceramic object, such as object 215, surrounded by an excess of compressed first powder (or enclosed by a solid metal obtained from the first powder). An example object surrounded by an excess of compressed first powder is illustrated in FIG. 2C. The kiln may heat the compressed greenware and excess of compressed first powder to a reaction temperature in workbox 150. In some embodiments, the hydraulic press compresses the greenware and excess of first powder prior to heating in the kiln. The compressed greenware may be in a cohesive, dense state, no longer needing active compressing during heating. In other embodiments, the hydraulic press may actively and continuously compresses the greenware and excess of first powder in the kiln while the greenware is heated to a reaction temperature to form an object.

The object surrounded by an excess of compressed first powder may be heated in the kiln to a melting temperature to remove the excess of compressed first powder through melting, and leave the object. Alternatively, the excess of compressed first powder may be removed by a chemical means, such as an acid or caustic etch bath. This disclosure contemplates any technique suitable to remove the excess of compressed first powder (or solid metal obtained from the first powder) from the object, including melting, chemical etching, and/or machining.

Workbox 150 may be any box, container, or enclosure of any size or shape made of any material suitable for containing layers of powder during 3D printing, suitable for containing a greenware surrounded by an excess of a first powder during hydraulic compression, and/or suitable for containing a compressed greenware surrounded by an excess of compressed first powder during heating in a kiln. Workbox 150 may include a solid enclosure that may surround print bed 140. Printheads 120 and 130 may be able to enter workbox 150 to deposit layers of powder. As an example, workbox 150 may include a metal box.

Print bed 140 may be any surface of inert material capable of having layers of powder deposited onto it, such as a powder bed box. Layers of powder may be deposited onto print bed 140 without reacting with print bed 140. In some embodiments, the volume of powder bed box containing layers of powder may be hydraulically compressed to form a compressed greenware.

Printheads 120 and 130 deposit layers of powder, such as first layer 125 of a first powder and second layer 135 of a second powder, onto print bed 140 in workbox 150. Printheads 120 and 130 may deposit any number of powders in either pre-mixed or non-pre-mixed form. Printheads 120 and 130 may be any 3D printing or additive manufacture printheads known in the art, or any other appropriate apparatus suitable for depositing layers of powder in known powder deposition 3D printing or additive manufacture techniques. For example, printhead 120 and/or printhead 130 may be an aerosol jet printing printhead, such as an Optomec. In some embodiments, printhead 120 may be configured to bulk deposit layers of a first powder, and printhead 130 may be configured to pattern-deposit layers of a second powder. Though 3D printer system 100 illustrates a particular number of printheads 120 and/or 130, this disclosure contemplates any suitable 3D printer system 100 having any suitable number of printheads in any suitable arrangement. For example, three or more printheads may be used if the composition of the desired object involves a ternary powder combination.

First layer 125 may include a first powder, and second layer 135 may include a second powder. In some embodiments, the first powder and second powder may have a composition of a variety of metallic or pre-ceramic powders, depending on the desired composition of the printed object. In some embodiments, the second powder is a pre-mixed powder containing more than one metal and/or pre-ceramic powder. As an example, the first powder may be aluminum (Al) and the second powder may be titanium (Ti). As another example, the first powder may be titanium (Ti) and the second powder may be a carbon-based (C) powder. This disclosure contemplates any suitable number of first layers 125 and/or second layers 135 in any suitable arrangement. This disclosure further contemplates second layer 135 including any suitable number of powders, to form, for example, binary, ternary, and onward printed objects.

In some embodiments, 3D printer system 100 may include a control unit 160. Control unit 160 may include a computer system that controls the printing of an object by providing instructions to 3D printer 110. Control unit 160 may be either external to 3D printer 110 or incorporated into 3D printer 110. Certain embodiments of control unit 160 are discussed in more detail below with respect to FIG. 4.

FIGS. 1B, 1C, and 1D illustrate example successive views of workbox 150 as it is progressively filled with layers of powder during 3D printing. FIG. 1B illustrates an example view of workbox 150 with first layer 125 deposited. First layer 125 may be surrounded by an excess of first powder 220. FIG. 1C illustrates an example view of workbox 150 during 3D printing when additional layers have been deposited, but before a last layer has been deposited. For example, FIG. 1C illustrates an example view of an intermediate layer 145. Additional layers such as layer 145 may be surrounded by an excess of first powder 220. FIG. 1D illustrates an example view of workbox 150 when a final layer, such as final layer 155, has been deposited. Depositing final layer 155 may form greenware 210. Greenware 210 may be surrounded by an excess of first powder 220.

FIG. 2A illustrates an example greenware 210 surrounded by an excess of first powder 220, according to certain embodiments. Greenware 210 may be surrounded by an excess of first powder 220 as illustrated in FIG. 2A after 3D printing but before hydraulic compression. First powder 220 may be any metal or carbon-based powder suitable to form an intermetallic or ceramic object at a reaction temperature, where the melting point of first powder 220 is lower than the intermetallic or ceramic object formed. For example, first powder 220 may be aluminum, titanium, or a rare-earth metal. Greenware 210 may include layers of powder deposited during 3D printing.

Greenware 210 surrounded by an excess of first powder 220 may be compressed by a hydraulic press to form a compressed greenware 212 surrounded by an excess of compressed first powder 220. Greenware 210 may have an extended or elongated form or shape compared to compressed greenware 212 and/or the desired intermetallic and/or ceramic object, to account for distortions during hydraulic compression.

FIG. 2B illustrates an example compressed greenware 212 surrounded by an excess of compressed first powder 220, according to certain embodiments. Compressed greenware 212 may be surrounded by an excess of compressed first powder 220 after hydraulic compression but before heating to a reaction temperature in a kiln. After hydraulic compression, excess of compressed first powder 220 may form a solid metal enclosing compressed greenware 212. Excess of compressed first powder 220 may protect inner compressed greenware 212 from atmosphere and support the structure of inner compressed greenware 212. These advantages of excess of first powder 220 allow the greenware to be heated in atmosphere, rather than in an inert atmosphere, and allow for the formation of complex non-self-supporting structures without the use of a binder.

Object 215 may be formed from heating compressed greenware 212 surrounded by an excess of compressed first powder 220 to a reaction temperature in a kiln. An example of object 215 surrounded by an excess of compressed first powder 220 after heating to a reaction temperature in a kiln is illustrated in FIG. 2C. Object 215 may be of any size or shape printed through powder-based 3D printing techniques. In some embodiments, object 215 may possess any size, shape, or other characteristic programmed by control unit 160. The shape of object 215 may be a complex, non-self-supporting three-dimensional shape, because excess of compressed first powder 220 may support the formation of object 215 during heating without the use of a binder. For example, and not by way of limitation, object 215 may be a turbine fan or a shuttle-cock. Object 215 may also be of a variety of densities, because the greenware from which object 215 is formed may not need a binding agent to hold it together. Because compressing greenware 210 formed by powder-based 3D printing techniques into compressed greenware 212 may alter the size or shape of greenware 210, control unit 160 may take into account a distortion factor in programming the dimensions of greenware 210 to result in the desired dimensions of object 215.

Object 215 may have a composition of a variety of intermetallics or ceramics. As an example of an intermetallic, object 215 may be composed of titanium aluminide (TiAl) formed from a greenware including aluminum (Al) and titanium (Ti) powders, where aluminum (Al) may be the first powder. As other examples of intermetallics, titanium (Ti) and scandium (Sc) powders may produce a TiSc intermetallic object 215, or yttrium (Y) and titanium (Ti) powders may produce a TiY intermetallic object 215. As an example of a ceramic composition, object 215 may be composed of titanium carbide ceramic (TiC), formed from a greenware including titanium and carbon-based powders, where titanium may be the first powder. As other examples of ceramics, tungsten (W) and carbon (C)-based powders may be used to produce a WC ceramic, hafnium (Hf) and carbon (C)-based powders may be used to produce HfC ceramics, and silicon (Si) and carbon (C)-based powders may be used to produce silicon carbide ceramics. Though examples of binary compositions of object 215 are provided, object 215 is not limited to binary compounds, and may also be composed of a variety of ternary and higher intermetallics or ceramics through use of additional powders.

Once object 215 is formed, excess of compressed powder 220 may be removed from object 215 according to a variety of methods or techniques, such as melting first powder 220 in a kiln, and/or by chemical means, such as an acid or caustic etch bath. In some embodiments, object 215 may be heated to a melting temperature to remove through melting excess of compressed first powder 220.

FIG. 2D illustrates an example embodiment of object 215 during heating to a melting temperature, according to certain embodiments. Heating to the melting temperature may occur in the kiln. The melting temperature may be the melting point of first powder 220, or any temperature sufficient to remove the excess of compressed first powder 220 from object 215. The melting temperature to remove excess of compressed first powder 220 may be a higher temperature than reaction temperature to form object 215, but lower than the melting point of object 215.

FIG. 3 illustrates a method of additive manufacture, according to certain embodiments. Method 300 may be performed by 3D printer system 100. Method 300 begins at step 305 where a first layer of a first powder is deposited using a first printhead, such as first printhead 120. First powder may be the first powder included in excess of first powder 220. For example and not by way of limitation, first powder may be aluminum (Al). The first powder may be deposited to form a first layer, such as first layer 125. The first powder may be deposited into a container or onto a plate, such as print bed 140 in workbox 150. In some embodiments, the first powder is bulk deposited without patterning. At step 310, a second layer of a second powder is deposited using a second printhead, such as second printhead 130. For example and not by way of limitation, the second powder may be titanium (Ti). The second powder may be deposited onto the first powder and/or into a container or onto a plate, such as print bed 140 in workbox 150. In some embodiments, the second powder is pattern-deposited. At steps 305 and 310, layers of the first powder and the second powder may be deposited in the shape of a cross section of the desired object, such as object 215. In some embodiments, an excess of the first powder may be deposited at step 305.

At step 315, if all layers of the first and second powders needed to form the object have not been deposited, 3D printer 100 will move back to step 305 where a new layer of the first powder is deposited. When all cross sections have been printed, resulting in a greenware such as greenware 210, method 300 may proceed to step 320. The resulting greenware may be surrounded by an excess of first powder.

At step 320, the greenware surrounded by an excess of first powder is compressed using a hydraulic press to form a compressed greenware, such as compressed greenware 212, surrounded by an excess of compressed first powder. The hydraulic press may be any device that generates a force to compress the greenware. Step 320 may occur in any variety of conditions, including in atmosphere.

At step 325, the compressed greenware surrounded by an excess of compressed first powder is heated to a reaction temperature using a kiln to form an object, such as object 215. A person of ordinary skill in the art would understand the reaction temperature depending on the desired composition of the object. For example, if the desired composition of the object is a titanium aluminide intermetallic (TiAl), the first powder may be aluminum (Al) and the second powder may be titanium (Ti). The reaction temperature may be the temperature at which titanium (Ti) and aluminum (Al) react to form a titanium aluminide intermetallic (TiAl). The kiln may include a variety of kilns, furnaces, ovens, or any heating chamber capable of heating greenwares to reaction temperatures to form intermetallic or ceramic objects. Heating in the kiln may occur in atmosphere or in inert atmosphere. The object is surrounded by an excess of compressed first powder, such as an excess of compressed first powder 220. The excess of compressed first powder may not have reacted to form the object. The object may be an intermetallic material, a ceramic, or any object formed by the reaction. The object may have a higher melting point than the first powder.

At step 330, the object surrounded by the excess of compressed first powder is heated using the kiln to a melting temperature to melt the excess of compressed first powder surrounding the object. The kiln may include any variety of mechanisms to drain or remove the melted first powder. Alternatively, the excess first powder may be removed by a chemical means, such as an acid or caustic etch bath. This disclosure contemplates any technique suitable to remove the excess of the first powder, including melting, chemical etching, and/or machining.

After printing, the object may be subjected to additional processing steps to prepare the object for use. Examples of post-printing processing may include: painting the object, polishing the object, treating the surface of the object to render it chemically inert or to make it chemically active, and assembly of another object or device from multiple printed objects.

Modifications, additions, or omissions may be made to method 300 depicted in FIG. 3. Method 300 may include more, fewer, or other steps. For example, steps may be performed in parallel or in any suitable order. While discussed as various components of system 100 performing the steps, any suitable component or combination of components of system 100 may perform one or more steps of the method.

FIG. 4 illustrates an example computer system 400 that may be used by the system of FIG. 1, according to certain embodiments. One or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for additive manufacture, comprising:
   forming a greenware by:
      (a) bulk depositing a first layer of a first powder on a print bed using a first printhead;
      (b) pattern depositing a second layer of a second powder on a print bed using a second printhead; and
      (c) repeating steps (a) and (b) to form the greenware;
   compressing the greenware using a hydraulic press to form a compressed greenware;
   heating the compressed greenware to a reaction temperature using a kiln to form an object, wherein the object is formed by a reaction between the first and second powders, and wherein the object is surrounded by an excess of the first powder; and heating the object surrounded by the excess of the first powder to a melting temperature using the kiln, wherein the melting temperature is at least the melting point of the first powder and less than the melting point of the object;

wherein heating to the melting temperature melts the excess of the first powder from around the object.

2. The method of claim 1, wherein the excess of the first powder is configured to structurally support the object as it is formed.

3. The method of claim 1, wherein the excess of the first powder is configured to protect the formation of the object from contamination by an atmosphere in the kiln.

4. The method of claim 1, wherein:
the first powder comprises a first metal material;
the second powder comprises a second metal material; and
the object comprises an intermetallic material.

5. The method of claim 1, wherein:
the first powder comprises a metal material;
the second powder comprises a carbon material; and
the object comprises a metal carbide ceramic.

6. The method of claim 1, wherein the second powder comprises a pre-mixed powder comprising a second metal material and a third metal material.

7. The method of claim 1, wherein the greenware is formed without a binder.

\* \* \* \* \*